(12) United States Patent
Ajioka et al.

(10) Patent No.: US 11,967,879 B2
(45) Date of Patent: Apr. 23, 2024

(54) ELECTRIC MOTOR

(71) Applicant: Mitsubishi Electric Corporation, Tokyo (JP)

(72) Inventors: Yoshifumi Ajioka, Tokyo (JP); Kazuki Iwasa, Tokyo (JP); Seiji Haga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 397 days.

(21) Appl. No.: 17/439,953

(22) PCT Filed: Apr. 10, 2019

(86) PCT No.: PCT/JP2019/015546
§ 371 (c)(1),
(2) Date: Sep. 16, 2021

(87) PCT Pub. No.: WO2020/208730
PCT Pub. Date: Oct. 15, 2020

(65) Prior Publication Data
US 2022/0158524 A1    May 19, 2022

(51) Int. Cl.
*H02K 5/20* (2006.01)
*H02K 7/00* (2006.01)
*H02K 9/06* (2006.01)

(52) U.S. Cl.
CPC .............. *H02K 5/207* (2021.01); *H02K 7/003* (2013.01); *H02K 9/06* (2013.01)

(58) Field of Classification Search
CPC .................................. H02K 5/207; H02K 7/003
See application file for complete search history.

(56) References Cited

U.S. PATENT DOCUMENTS

2012/0212086 A1* 8/2012 Nagayama ............... H02K 5/15
310/59

FOREIGN PATENT DOCUMENTS

JP    H02110963 U    9/1990
JP    2005333795 A   12/2005
(Continued)

OTHER PUBLICATIONS

WO-2018179269-A1_translate (Year: 2018).*
(Continued)

*Primary Examiner* — Tulsidas C Patel
*Assistant Examiner* — Mohammed Ahmed Qureshi
(74) *Attorney, Agent, or Firm* — BUCHANAN INGERSOLL & ROONEY PC

(57) ABSTRACT

A first bracket in an electric motor includes an inflow path through which outside air flows inside, and an outflow path through which the air having flowed in flows outside. A stator core included in the electric motor includes a first ventilation path that is coupled with the inflow path and a second ventilation path that is coupled with the outflow path. A second bracket includes a third ventilation path that forms a flow path from the first ventilation path to the second ventilation path positioned symmetrically to the first ventilation path with respect to a plane containing a rotation axis. The air having flowed into the inside of the electric motor through the inflow path passes, in order, through the first ventilation path, the third ventilation path, and the second ventilation path, and flows out to the outside of the electric motor through the outflow path.

16 Claims, 17 Drawing Sheets

(56) References Cited

FOREIGN PATENT DOCUMENTS

| JP | 2007332848 A | 12/2007 | | |
|----|--------------|---------|---|---|
| KR | 20110089717 A | 8/2011 | | |
| WO | WO-2018179269 A1 | * | 10/2018 | ............... B61C 3/00 |

OTHER PUBLICATIONS

Office Action dated Mar. 2, 2022, issued in corresponding Indian Patent Application No. 202127039636, 5 pages.
International Search Report (PCT/ISA/210) with translation and Written Opinion (PCT/ISA/237) dated Jul. 9, 2019, by the Japan Patent Office as the International Searching Authority for International Application No. PCT/JP2019/015546. (9 pages).

* cited by examiner

ELECTRIC MOTOR

TECHNICAL FIELD

The present disclosure relates to an electric motor.

BACKGROUND ART

An electric motor includes a shaft, a rotor that is attached to and rotates integrally with the shaft, and a stator that faces the rotor with a spacing therebetween in a radial direction. Energizing the electric motor increases temperatures of the stator and the rotor. In order to prevent occurrence of malfunctions due to an increase in a temperature inside the electric motor, cooling of the inside of the electric motor is performed by causing air blown by a blower disposed outside the electric motor to flow through a ventilation path formed in a stator core. Patent Literature 1 discloses an example of such kind of electric motor. According to the electric motor disclosed in Patent Literature 1, air having flowed from an intake hole into the inside of the electric motor passes through a ventilation hole formed in a stator and a flow path inside a casing, and passes through another ventilation hole formed in the stator again, and then flows out from an exhaust hole to the outside of the electric motor. This configuration enables cooling of the inside of the electric motor.

CITATION LIST

Patent Literature

Patent Literature 1: Unexamined Japanese Utility Model Application Publication No. H02-110963

SUMMARY OF INVENTION

Technical Problem

In the electric motor disclosed in Patent Literature 1, as illustrated in FIG. 3, the air having flowed from the intake hole into the inside of the electric motor, passed through the ventilation hole formed in the stator core, and reached the casing, goes toward a shaft, flows in a direction away from the shaft after reaching the vicinity of the shaft, passes through the another ventilation hole formed in the stator core, and flows out from the exhaust hole to the outside of the electric motor. According to this electric motor, the flow of air having reached the casing, after going toward the shaft, bends back in the direction away from the shaft, resulting in a high pressure drop in the flow path. The high pressure drop leads to a small volume of air flowing into the electric motor, resulting in a low cooling capacity of the electric motor.

The present disclosure is made in view of the aforementioned circumstances, and an objective of the present disclosure is to provide an electric motor that has a high cooling capacity.

Solution to Problem

To achieve the aforementioned objective, an electric motor according to the present disclosure includes a shaft, a rotor, a stator, a first bracket, and a second bracket. The shaft is rotatably supported for rotation around a rotation axis. The rotor is disposed outwardly of the shaft in a radial direction and rotates integrally with the shaft. The stator faces the rotor with a spacing therebetween in the radial direction. The first bracket includes (i) an inflow path through which air of an outside flows into an inside and (ii) an outflow path through which the air having flowed through the inflow path into the inside flows out to the outside. The second bracket, with the first bracket, sandwiches the rotor and the stator in a direction of the rotation axis. The stator includes (i) a first ventilation path that penetrates the stator from an end to another end thereof in the direction of the rotation axis and communicates with the inflow path and (ii) a second ventilation path that penetrates the stator from the end to the another end thereof in the direction of the rotation axis, communicates with the outflow path, and is positioned spaced from the first ventilation path in a circumferential direction with respect to the rotation axis. The second bracket includes a third ventilation path that forms a flow path from the first ventilation path to the second ventilation path positioned opposite to the first ventilation path with respect to a plane containing the rotation axis. The air having flowed through the inflow path into the inside passes, in order, through the first ventilation path, the third ventilation path, and the second ventilation path, and flows out to the outside through the outflow path.

Advantageous Effects of Invention

According to the present disclosure, the air having flowed through the inflow path into the inside passes, in order, through the first ventilation path, the third ventilation path, and the second ventilation path, and flows out to the outside through the outflow path. Since the air flows through the first ventilation path, the third ventilation path, and the second ventilation path, in order, a cross-section of a flow path is smaller than, while a surface area of the flow path being the same as, in a case in which a flow path is formed unidirectionally, resulting in a high flowing speed of air and a high cooling capacity of the electric motor. Further, a pressure drop is smaller than in a case in which flow of air in a bracket goes toward a shaft, and bends back in a direction away from the shaft. The cooling capacity of the electric motor increases due to an increase in a volume of air flowing into the electric motor relative to a conventional electric motor.

DESCRIPTION OF EMBODIMENTS

Figure 1:
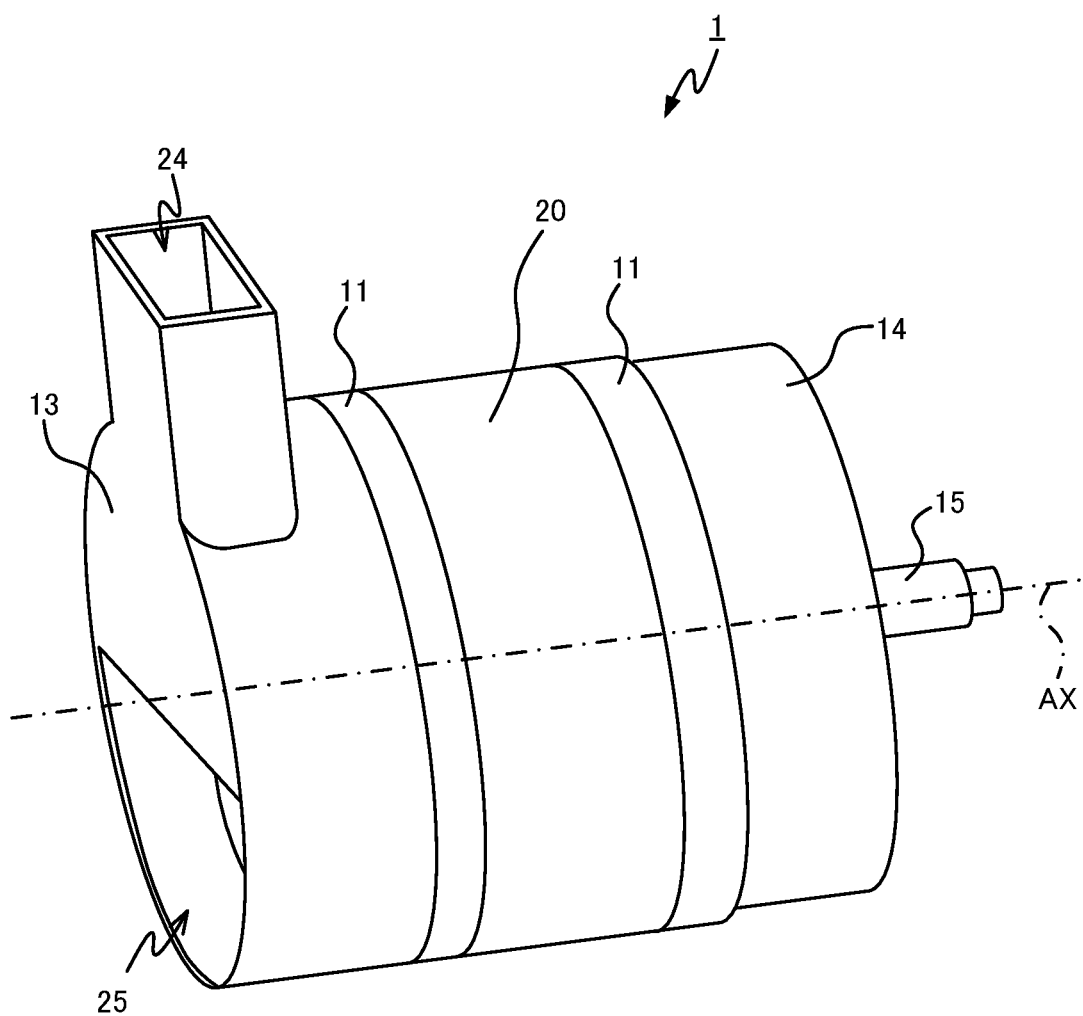
FIG. 1 is a perspective view of an electric motor according to Embodiment 1 of the present disclosure.

Hereinafter, embodiments of an electric motor according to the present disclosure are described in detail with reference to the drawings. In the drawings, the same reference sign is assigned to the same or equivalent parts.

Embodiment 1

Figure 2:
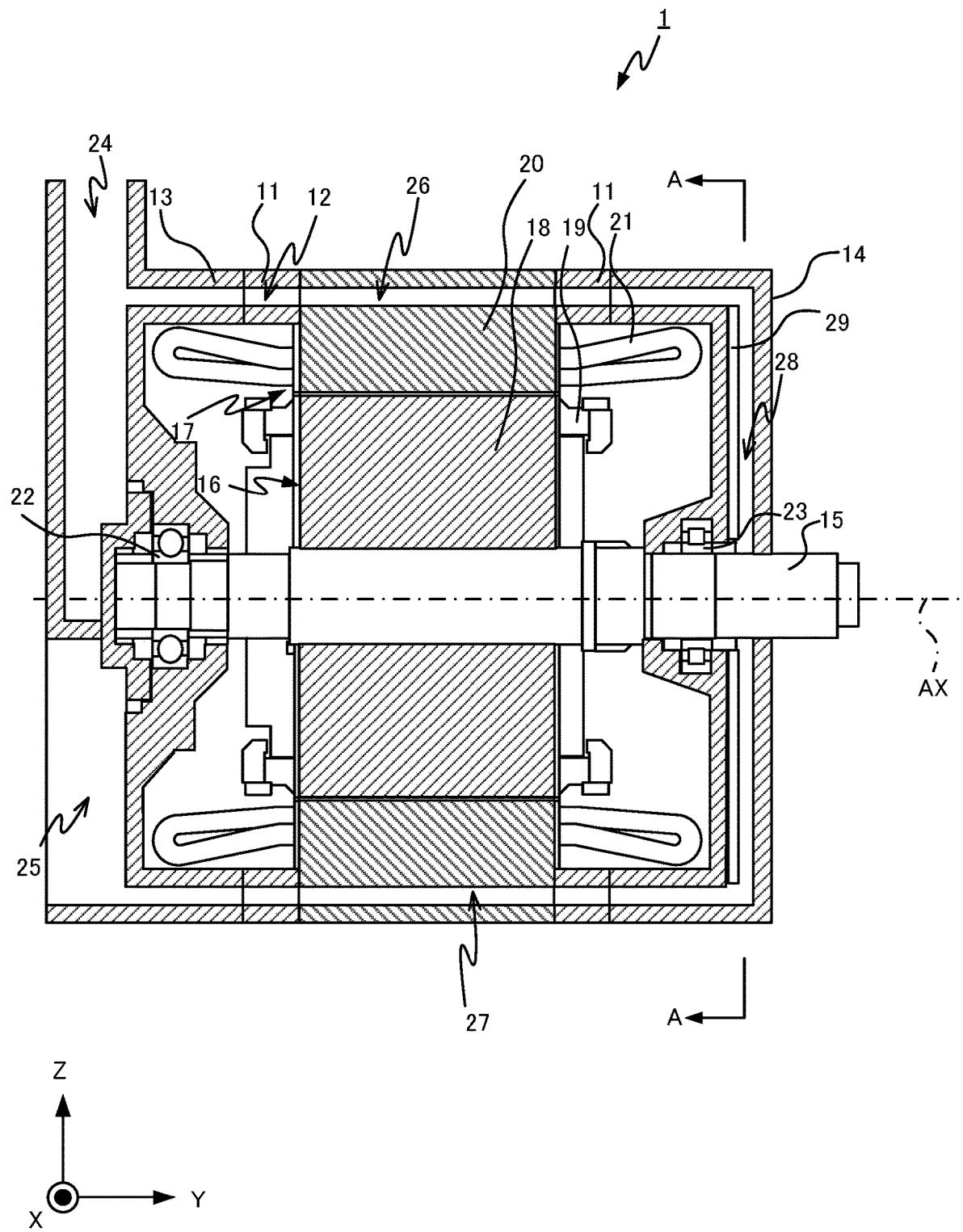
FIG. 2 is a cross-sectional view of the electric motor according to Embodiment 1.

An electric motor according to Embodiment 1 is described using, as an example, an electric motor used for driving a railroad vehicle. As illustrated in FIGS. 1 and 2, an electric motor 1 according to Embodiment 1 includes a pair of frames 11, a shaft 15 positioned inwardly of the frames 11 in a radial direction, a rotor 16 that rotates integrally with the shaft 15, and a stator 17 that is sandwiched and fixed by the pair of the frames 11. In FIGS. 1 and 2, the Z-axis is a vertical direction, the Y-axis is parallel to a rotation axis AX of the shaft 15, and the X-axis is orthogonal to the Y-axis and the Z-axis. In FIGS. 1 and 2, the dashed-dotted line indicates the rotation axis AX. Since the electric motor 1 is used as an electric motor for driving a railroad vehicle, the pair of the frames 11 is fixed to a bogie of the railroad vehicle.

The rotor 16 is disposed outwardly of the shaft 15 in the radial direction. The rotor 16 includes a rotor core 18 that is fitted to the shaft 15, and rotor conductors 19 that are received in grooves formed in an outer peripheral surface of the rotor core 18. The stator 17 includes a stator core 20 that is sandwiched by the pair of the frames 11 in a direction of the rotation axis AX, and stator conductors 21 that are received in grooves formed in the stator core 20. The outer peripheral surface of the rotor core 18 and an inner peripheral surface of the stator core 20 face each other with a spacing therebetween. Further, the electric motor 1 includes a first bracket 13 and a second bracket 14 that sandwich, in the direction of the rotation axis AX, the pair of the frames 11 that sandwich and hold the stator core 20 in the direction of the rotation axis AX, and bearings 22 and 23 that rotatably support the shaft 15. The bearing 22 is held by the first bracket 13, and the bearing 23 is held by the second bracket 14. The shaft 15 has one end that is close to the second bracket 14 and is coupled to an axle of the railroad vehicle via non-illustrated coupling and gear, and rotation of the shaft 15 generates motive power of the railroad vehicle. The one end of the shaft 15 that is coupled to the axle is referred to as a driving side, and the other end is referred to as a counter-driving side.

Cooling of the inside of the electric motor 1 is performed by causing air blown by a non-illustrated blower disposed outside the electric motor 1 to flow through the inside of the electric motor 1. A structure for cooling of the inside of the electric motor 1 is described. The first bracket 13 includes an inflow path 24 through which air flows into the inside of the electric motor 1, and an outflow path 25 through which the air having flowed through the inflow path 24 into the inside of the electric motor 1 flows out. Specifically, the inflow path 24 included in the first bracket 13 extends inwardly in the radial direction from an upper end in the Z-axis direction. The inflow path 24 diverges and extends in the direction of the rotation axis AX. Each of the frames 11 has a through-hole 12 penetrating from one end to the other end thereof in the direction of the rotation axis AX. For example, each of the frames 11 includes two tubes having mutually different outer diameters and positioned with a spacing therebetween in the radial direction, and a space between the two tubes forms the through-hole 12.

Figure 3:
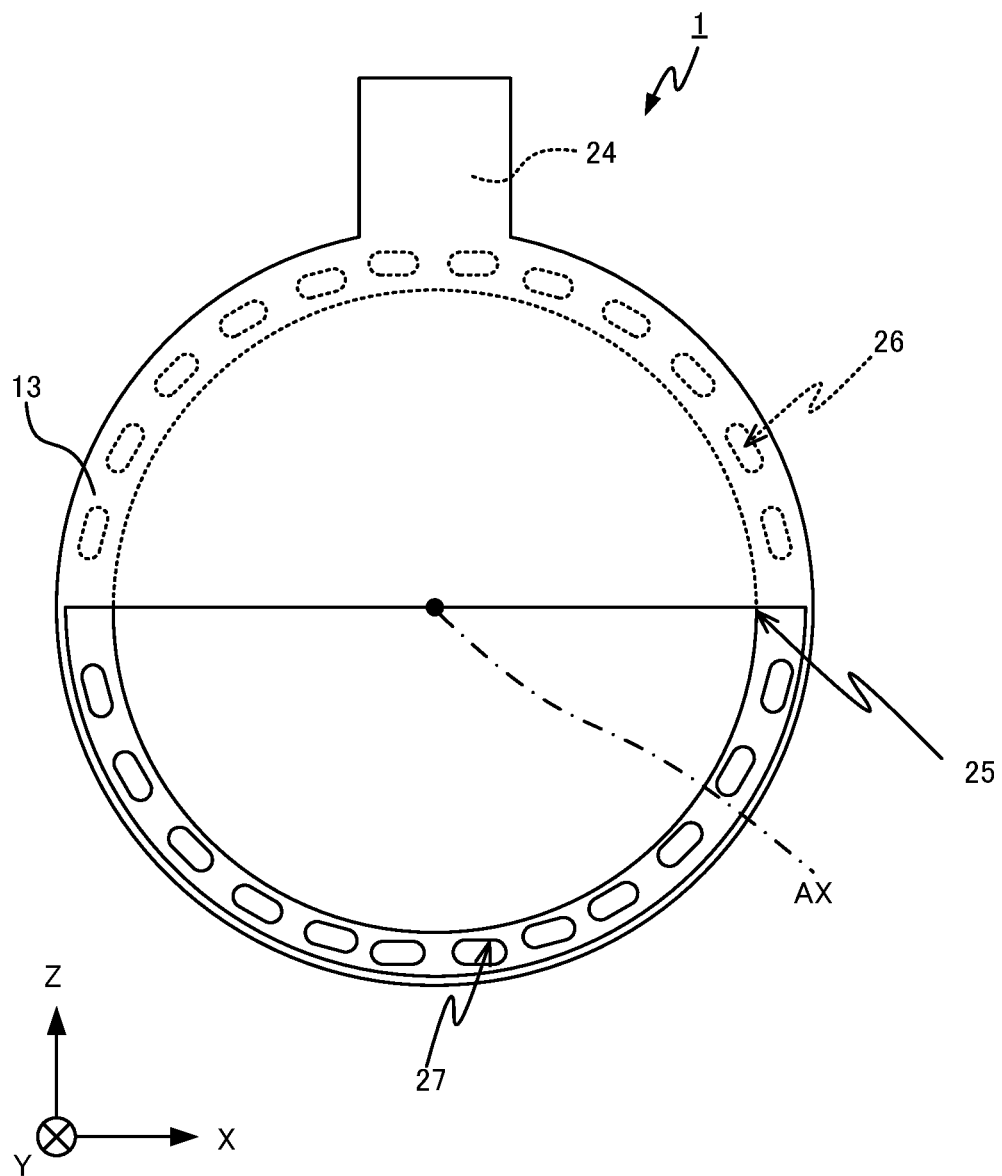
FIG. 3 is a side view of the electric motor according to Embodiment 1.

The stator core 20 includes a first ventilation path 26 penetrating from one end to the other end thereof in the direction of the rotation axis AX and communicating with the inflow path 24, and a second ventilation path 27 penetrating from one end to the other end thereof in the direction of the rotation axis AX and communicating with the outflow path 25. Specifically, the first ventilation path 26 is coupled with the inflow path 24 via the through-hole 12, and the second ventilation path 27 is coupled with the outflow path 25 via the through-hole 12. The second bracket 14 includes a third ventilation path 28 that forms a flow path from the first ventilation path 26 to the second ventilation path 27. The outflow path 25 included in the first bracket 13 at the lower side thereof in the vertical direction is coupled with the second ventilation path 27 via the through-hole 12 of the frame 11 and has, as illustrated in FIG. 3 that is a drawing of the electric motor 1 as viewed in a positive Y-axis direction, a semicircular shape in a cross section orthogonal to the rotation axis AX.

Figure 4:
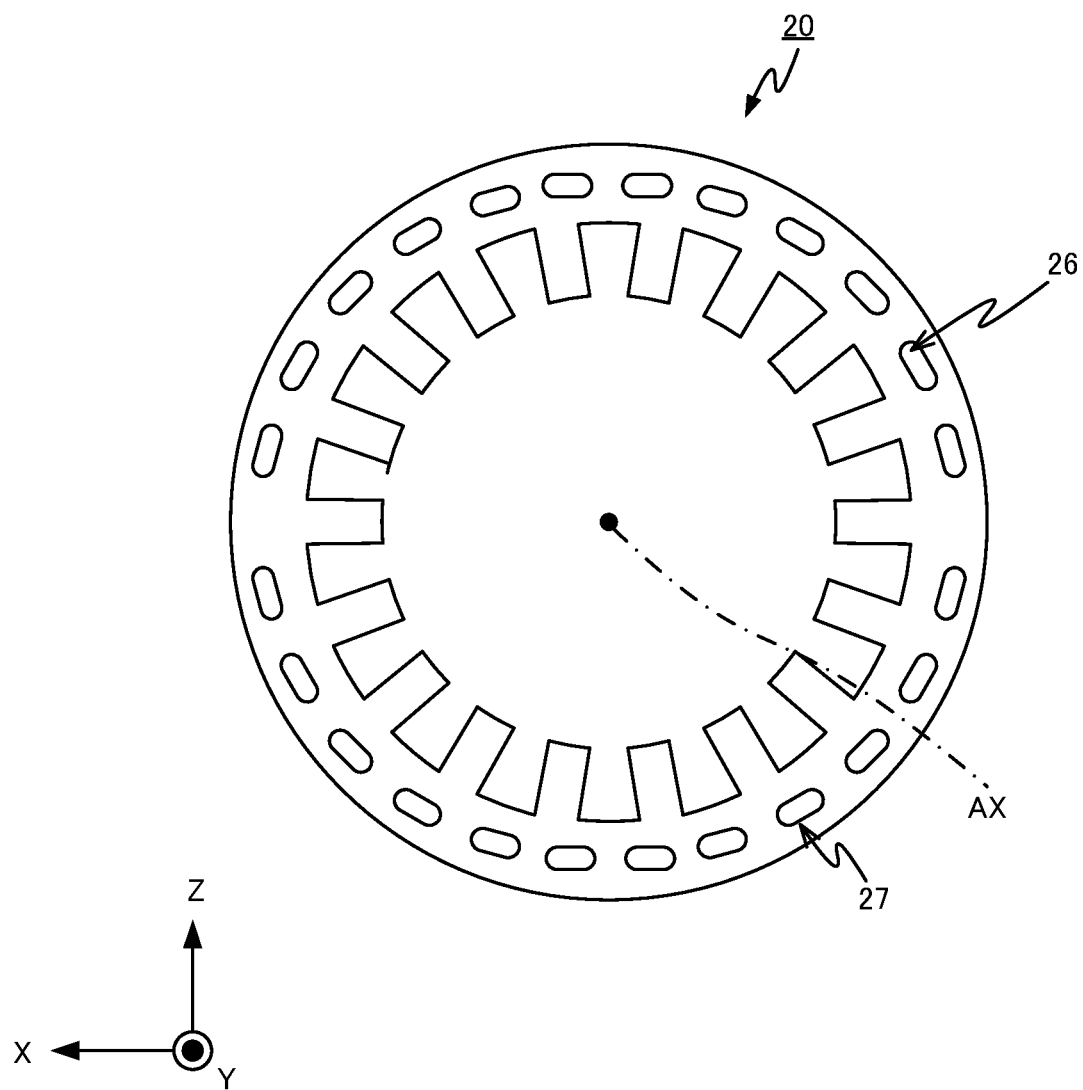
FIG. 4 is a side view of a stator core according to Embodiment 1.

As illustrated in FIG. 4 that is a drawing of the stator core 20 as viewed in a negative Y-axis direction, the stator core 20 includes the first ventilation path 26 and the second ventilation path 27 positioned opposite to the first ventilation path 26 with respect to an XY plane containing the rotation axis AX. Specifically, the stator core 20 includes the first ventilation path 26 and the second ventilation path 27 positioned symmetrically to the first ventilation path 26 with respect to the XY plane containing the rotation axis AX. More specifically, multiple first ventilation paths 26 are positioned in the vertical-direction upper half of the stator core 20, with spacings in a circumferential direction. Multiple second ventilation paths 27 are positioned in the vertical-direction lower half of the stator core 20, with spacings in the circumferential direction. In other words, the second ventilation paths 27 are positioned symmetrically to the first ventilation paths 26 with respect to the XY plane containing the rotation axis AX.

Figure 5:
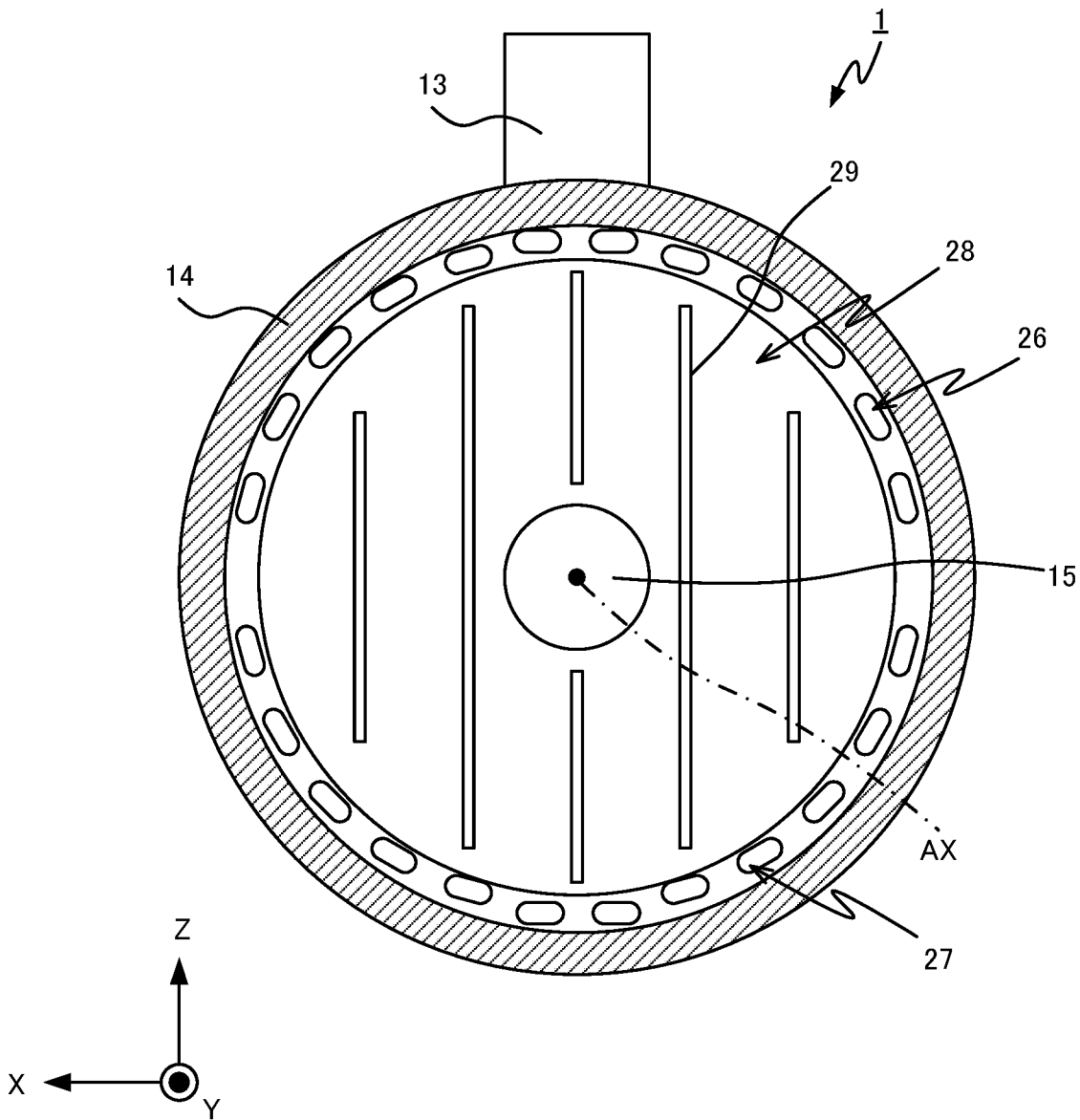
FIG. 5 is a cross-sectional view of a second bracket according to Embodiment 1.

As illustrated in FIG. 5 that is a cross-sectional view taken along the A-A line in FIG. 2, the second bracket 14 includes the third ventilation path 28 that forms the flow path from the first ventilation path 26 to the second ventilation path 27 positioned symmetrically to the first ventilation paths 26 with respect to the XY plane containing the rotation axis AX. For smooth flow of air from the first ventilation path 26 to the second ventilation path 27, the second bracket 14 includes, in the third ventilation path 28, air flow baffle plates 29 extending in the Z-axis direction.

Figure 6:
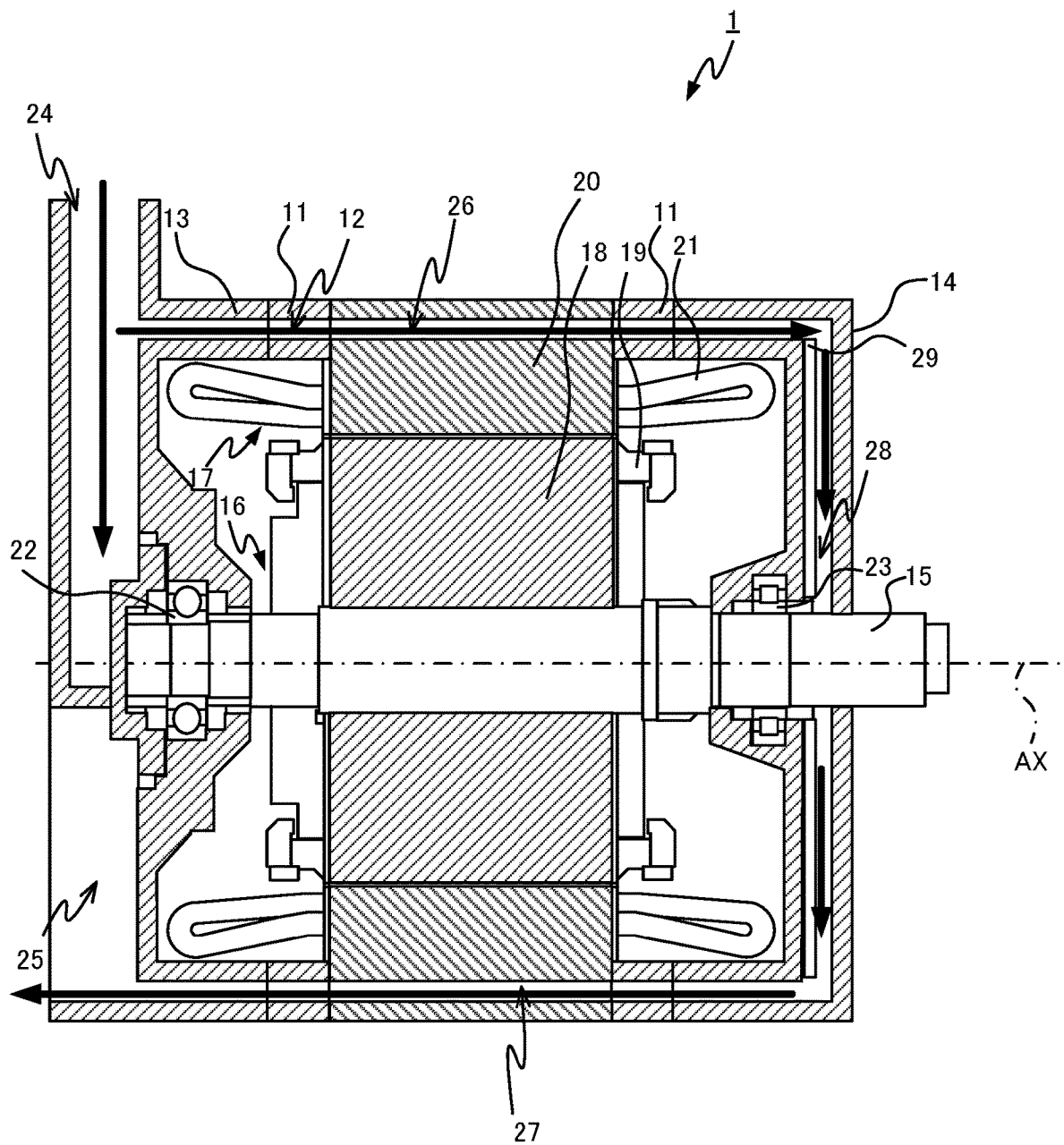
FIG. 6 illustrates a flow of air in the electric motor according to Embodiment 1.
Figure 7:
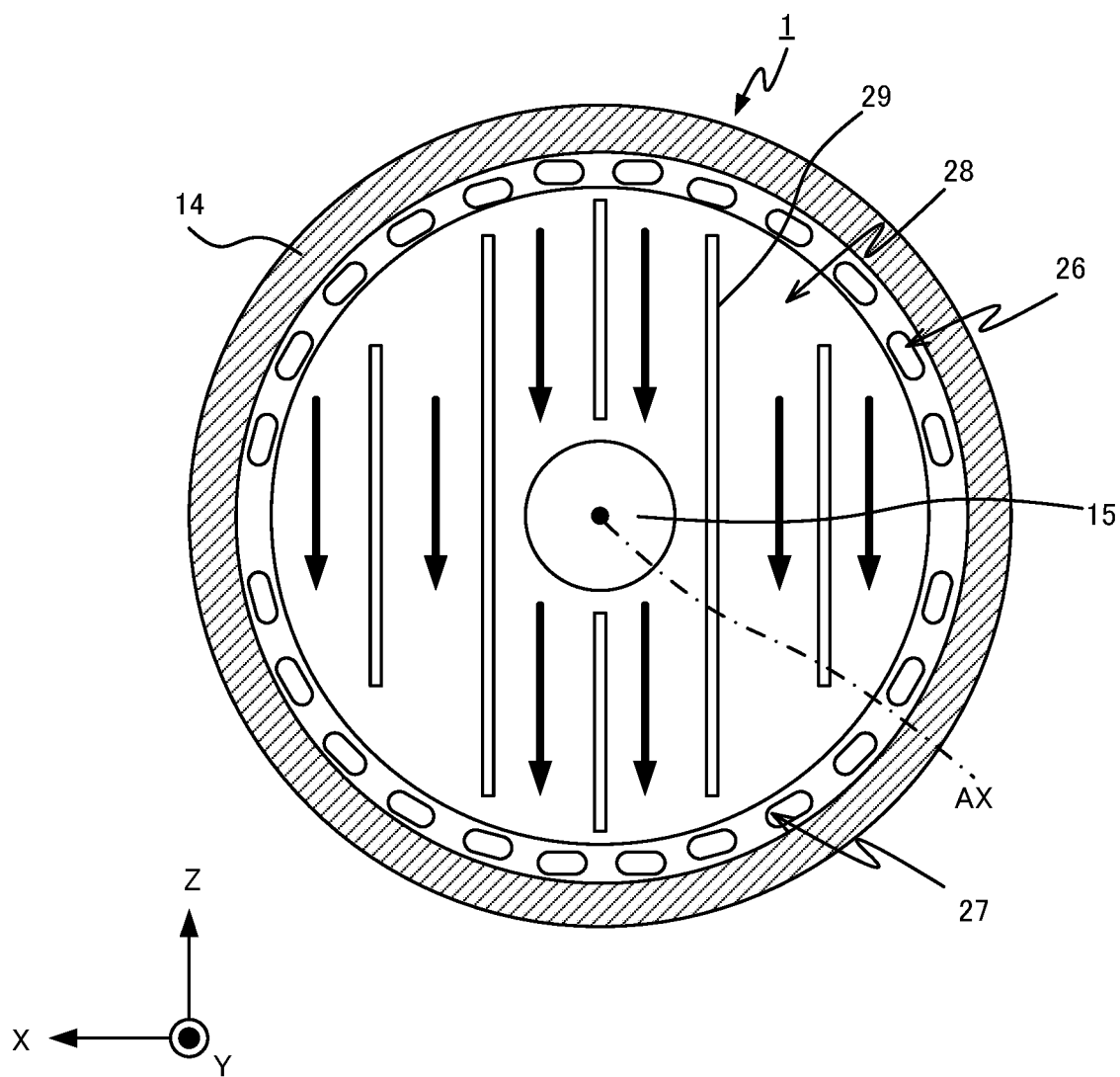
FIG. 7 illustrates a flow of air in the electric motor according to Embodiment 1.

Flows of air in the electric motor 1 having the aforementioned configuration are explained using FIGS. 6 and 7. In FIGS. 6 and 7, the flows of air are illustrated using solid arrows. The air blown by the blower disposed outside the electric motor 1 flows into the inside of the electric motor 1 through the inflow path 24, as illustrated in FIG. 6. That is to say, the air blown by the blower passes through the inflow path 24 and reaches the through-hole 12. The air having flowed into the first ventilation path 26 through the through-hole 12 flows through the first ventilation path 26 from the counter-driving side to the driving side. The air having reached the third ventilation path 28 through the first ventilation path 26 flows through the third ventilation path 28 in a negative Z-axis direction along the air flow baffle plates 29 extending parallel to the Z-axis direction as illustrated in FIG. 7. The air having reached the second ventilation path 27 through the third ventilation path 28 flows through the second ventilation path 27 from the driving side to the counter-driving side, as illustrated in FIG. 6. The air having passed through the second ventilation path 27 flows out to the outside of the electric motor 1 through the outflow path 25. At the inflow path 24, a part of the air flows in the negative Z-axis direction and reaches the vicinity of the bearing 22. Flowing of the air through the inside of the electric motor 1 as described above cools the rotor 16, the stator 17, the bearings 22 and 23, and the like.

In the third ventilation path 28, the air flows unidirectionally, that is, in the negative Z-axis direction. Thus, the electric motor 1 has a smaller pressure drop in a flow path than a conventional electric motor in which flow of air in a bracket at a driving side goes toward a shaft, and bends back in a direction away from the shaft, if conditions other than specified above are the same. Additionally, in comparison to a conventional electric motor in which air flows unidirectionally through a ventilation path of a stator core, the electric motor 1 has the same heat radiation area while being smaller in a cross-section of a flow path than the conventional electric motor, and the electric motor 1 is higher in speed of air flowing in the flow path and higher in cooling capacity than the conventional electric motor, if conditions other than specified above are the same.

As described above, the electric motor 1 according to Embodiment 1 includes a flow path that passes through the first ventilation path 26, the third ventilation path 28, and the second ventilation path 27, in order, and in which no bending back occurs in the third ventilation path 28. This enables a pressure drop in the electric motor 1 that is smaller than that in the conventional electric motor, leading to an improvement in cooling capacity of the electric motor 1.

Embodiment 2

Figure 8:
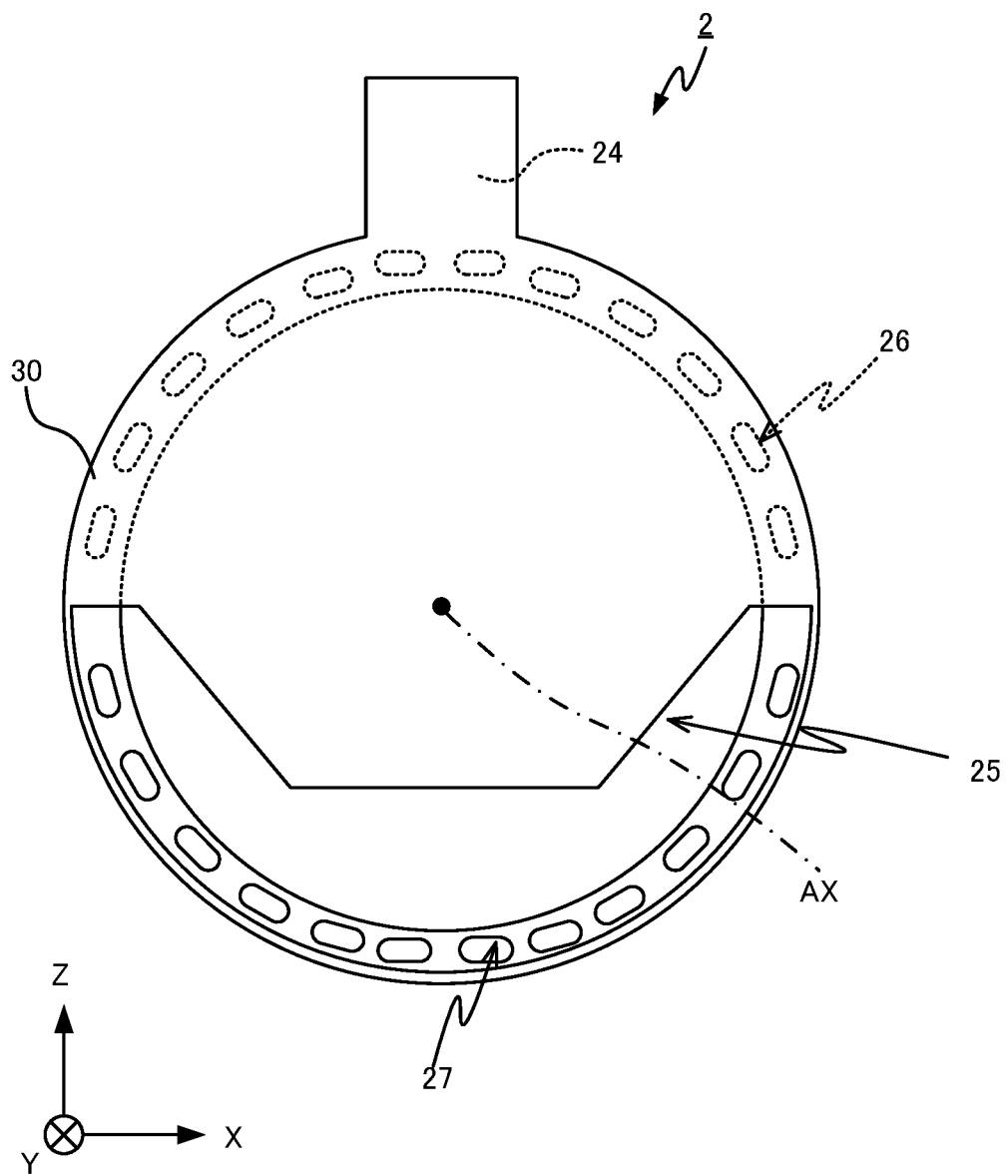
FIG. 8 is a side view of an electric motor according to Embodiment 2.
Figure 9:
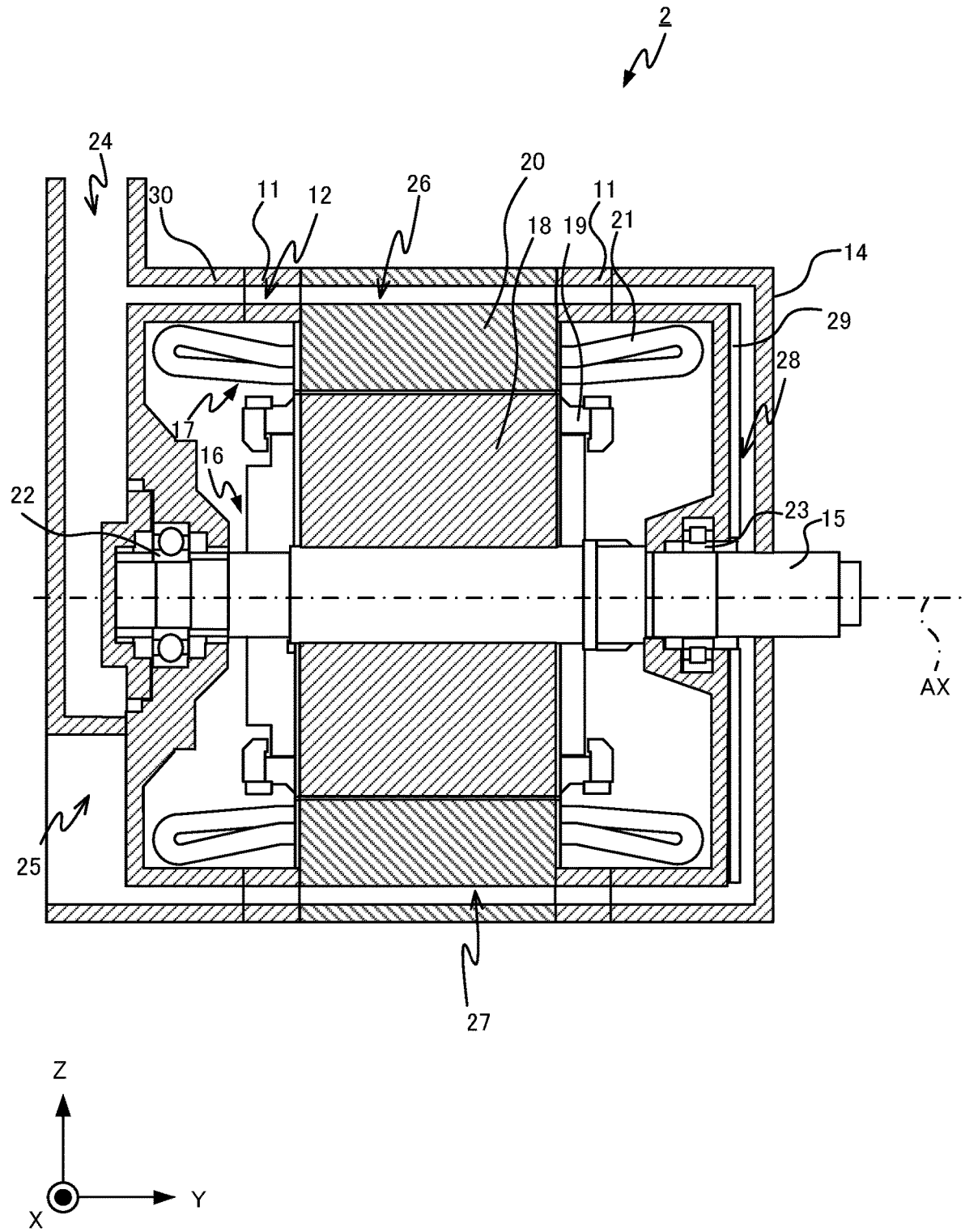
FIG. 9 is a cross-sectional view of the electric motor according to Embodiment 2.

The first bracket 13 may have any shape through which the air flows into the inside of an electric motor, through which the air having flowed in flows out, and that leads to a pressure drop that is smaller than that in a conventional electric motor. In Embodiment 2, an example electric motor is described that has a configuration in which the inflow path 24 extends inwardly in the radial direction from the Z-axis upper end of the first bracket 13 and further extends beyond the rotation axis AX. An electric motor 2 according to Embodiment 2 that is illustrated in FIGS. 8 and 9 includes, instead of the first bracket 13 included in the electric motor 1 according to Embodiment 1, a first bracket 30. The first bracket 30 includes an inflow path 24 that extends inwardly in the radial direction from the Z-axis direction upper end and further extends beyond the rotation axis AX. The inflow path 24 extends in the direction of the rotation axis AX and is coupled with the first ventilation path 26. Further, the first bracket 30 includes, at the lower side thereof in the vertical direction, an outflow path 25 that communicates with the second ventilation path 27.

Since the inflow path 24 extends inwardly in the radial direction from the upper end of the first bracket 30 in the vertical direction and further extends beyond the rotation axis AX, a part of air in the inflow path 24 reaches a lower end of the bearing 22 in the vertical direction and cools the lower end of the bearing 22.

As described above, due to the inclusion of the first bracket 30, the electric motor 2 according to Embodiment 2 cools the bearing 22 more in the electric motor 1. This enables an improvement in efficiency of cooling by the electric motor 2.

Embodiment 3

Figure 10:
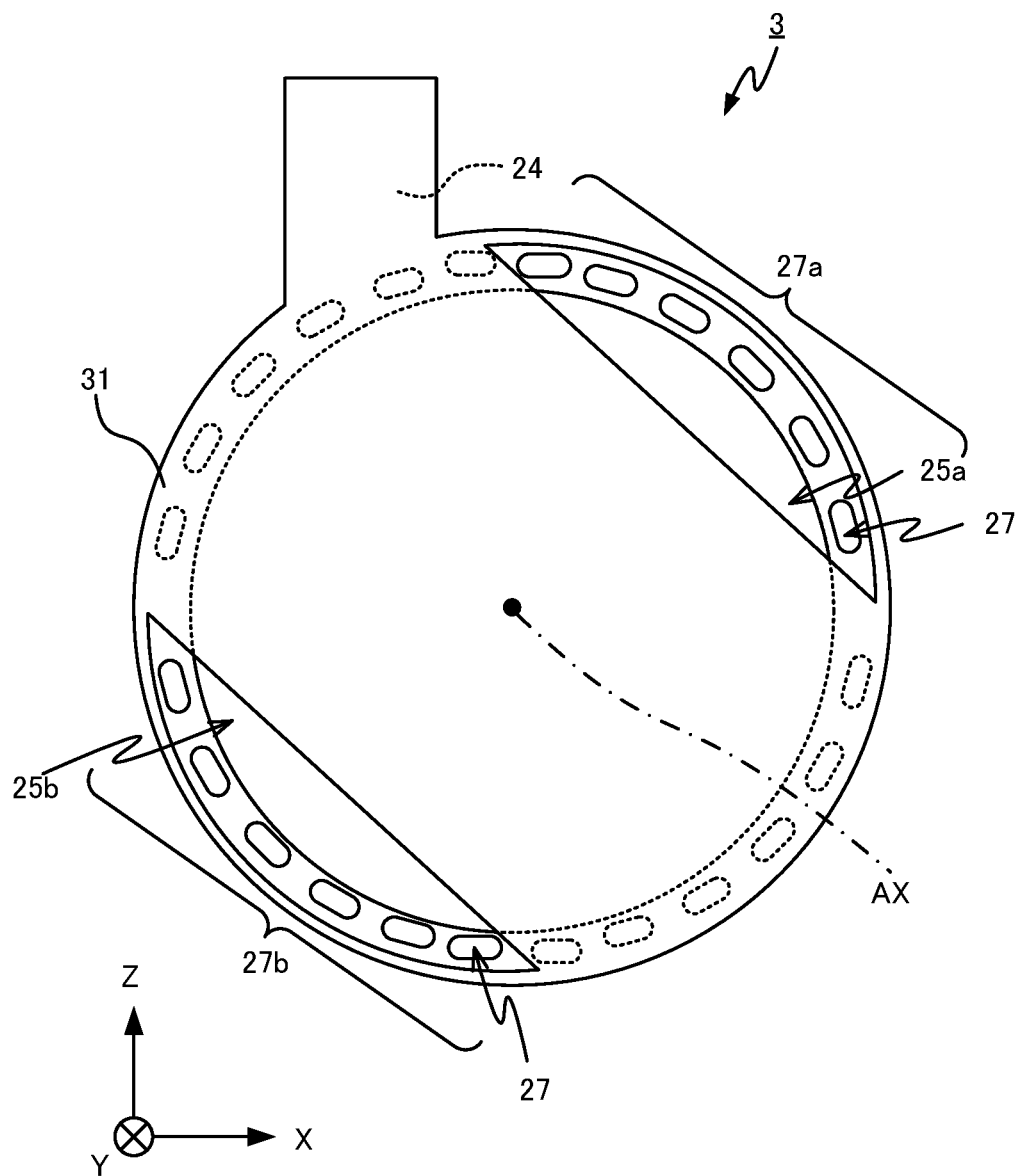
FIG. 10 is a side view of an electric motor according to Embodiment 3.

According to Embodiments 1 and 2, multiple first ventilation paths 26 are positioned in the upper side of the stator core 20 in the vertical direction, with spacings in the circumferential direction, and multiple second ventilation paths 27 are positioned in the lower side of the stator core 20 in the vertical direction, with spacings in the circumferential direction. With regard to an arrangement of the first ventilation path and the second ventilation path, any arrangement may be employed that enables a pressure drop in a flow path that is smaller than in the case of using a conventional electric motor. In Embodiment 3, an example electric motor is described that includes multiple first ventilation path groups that each include multiple first ventilation paths, and multiple second ventilation path groups that each include multiple second ventilation paths. An electric motor 3 according to Embodiment 3 that is illustrated in FIG. 10 includes, instead of the first bracket 13 included in the electric motor 1 according to Embodiment 1, a first bracket 31. The first bracket 31 includes two outflow paths 25a and 25b positioned symmetrically with respect to the rotation axis AX. The outflow path 25a is coupled with, via the through-hole 12 of the frame 11, second ventilation paths 27 included in a second ventilation path group 27a described below, and the outflow path 25b is coupled with, via the through-hole 12 of the frame 11, second ventilation paths 27 included in a second ventilation path group 27b described below.

Figure 11:
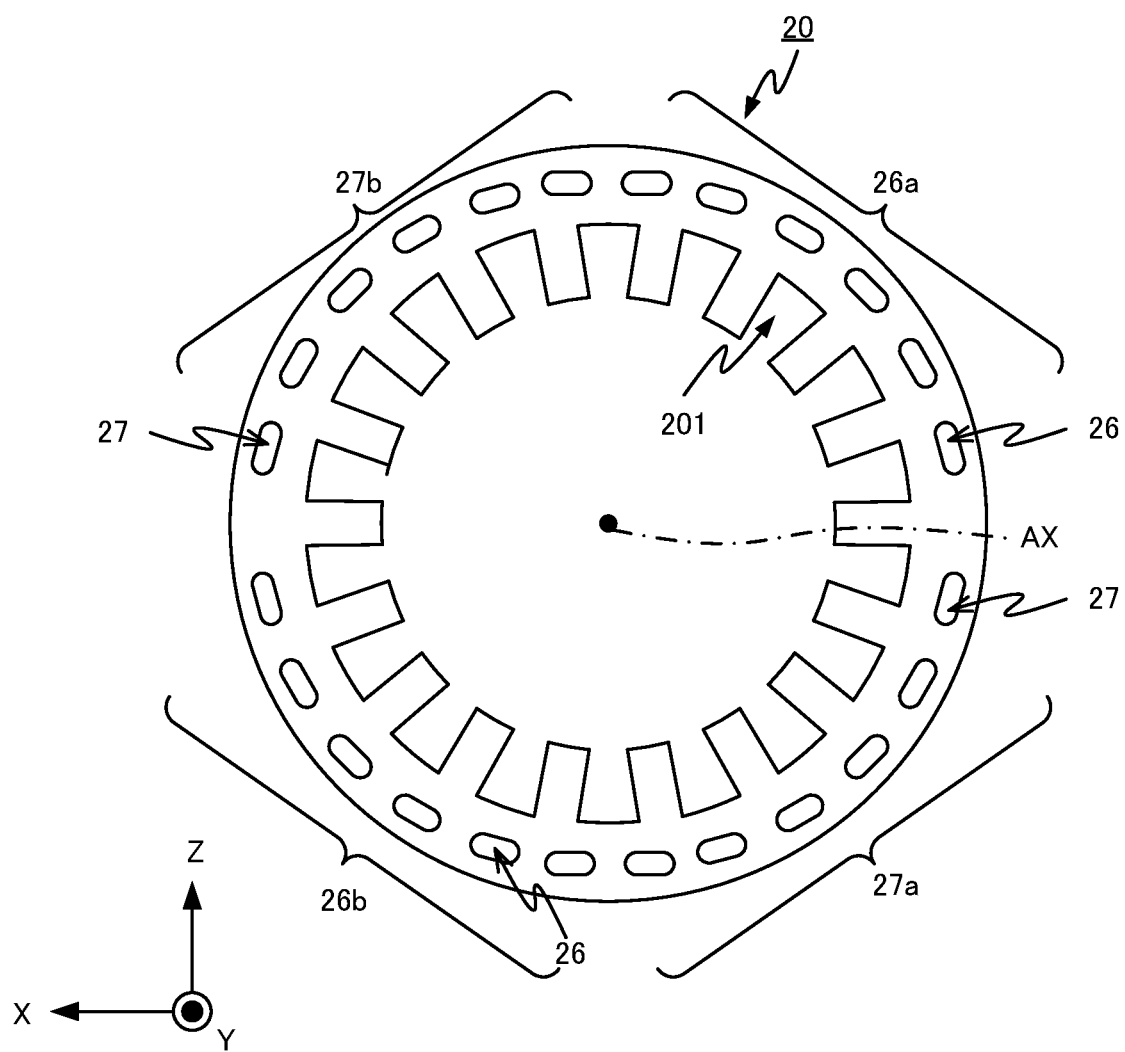
FIG. 11 is a side view of a stator core according to Embodiment 3.

As illustrated in FIG. 11 that is a drawing of the stator core 20 as viewed in the negative Y-axis direction, the stator core 20 includes multiple first ventilation path groups 26a and 26b that each include multiple first ventilation paths 26, and multiple second ventilation path groups 27a and 27b that each include multiple second ventilation paths 27. The first ventilation path groups 26a and 26b and the second ventilation path groups 27a and 27b are equal in number, and the first ventilation path groups 26a and 26b and the second ventilation path groups 27a and 27b are positioned alternately in the circumferential direction. Specifically, as illustrated in FIG. 11, the first ventilation path group 26a, the second ventilation path group 27a, the first ventilation path group 26b, and the second ventilation path group 27b, are disposed, in order, clockwise in the circumferential direction. Further, the first ventilation path groups 26a and 26b are positioned symmetrically with respect to the rotation axis AX, and the second ventilation path groups 27a and 27b are positioned symmetrically with respect to the rotation axis AX. More specifically, the first ventilation path group 26a is formed in the stator core 20 at a part on a positive Z-axis direction side with respect to the rotation axis AX and on a negative X-axis direction side with respect to the rotation axis AX, whereas the first ventilation path group 26b is formed in the stator core 20 at a part on a negative Z-axis direction side with respect to the rotation axis AX and on a positive X-axis direction side with respect to the rotation axis AX. Both of the first ventilation paths 26 included in the first ventilation path group 26a and the first ventilation paths 26 included in the first ventilation path group 26b are coupled with the inflow path 24 via the through-hole 12. The second ventilation paths 27 included in the second ventilation path group 27a are coupled with the outflow path 25a via the through-hole 12, and the second ventilation paths 27 included in the second ventilation path group 27b are coupled with the outflow path 25b via the through-hole 12.

Figure 12:
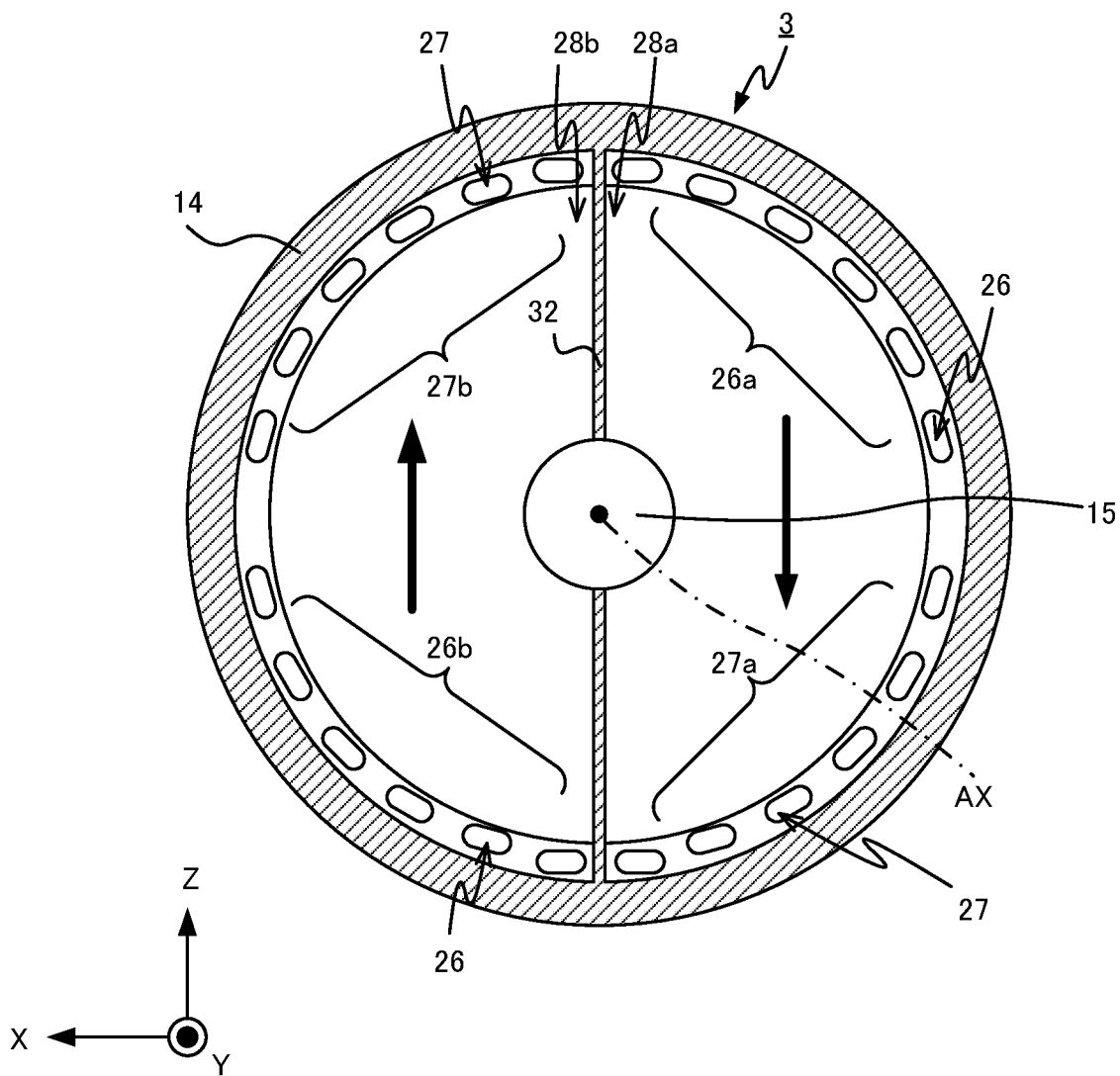
FIG. 12 is a cross-sectional view of a second bracket according to Embodiment 3.

In FIG. 12 that is a cross-sectional view of the second bracket 14 as viewed in the negative Y-axis direction, flows of air are illustrated using solid arrows. The second bracket 14 includes (i) a third ventilation path 28a that forms a flow path from the first ventilation paths 26 included in the first ventilation path group 26a to the second ventilation paths 27 included in the second ventilation path group 27a, and (ii) a third ventilation path 28b that forms a flow path from the first ventilation paths 26 included in the first ventilation path group 26b to the second ventilation paths 27 included in the second ventilation path group 27b. A partition wall 32 separates the third ventilation path 28a from the third ventilation path 28b, and thus no flow of air occurs between the third ventilation paths 28a and 28b. As illustrated in FIG. 12, the first ventilation paths 26 included in the first ventilation path group 26a and the second ventilation paths 27 included in the second ventilation path group 27a are positioned symmetrically with respect to the XY plane containing the rotation axis AX, and the first ventilation paths 26 included in the first ventilation path group 26b and the second ventilation paths 27 included in the second ventilation path group 27b are positioned symmetrically with respect to the XY plane containing the rotation axis AX.

In the third ventilation path 28a, the air flows unidirectionally, that is, in the negative Z-axis direction, and in the third ventilation path 28b, the air flows unidirectionally, that is, in the positive Z-axis direction. Thus, the electric motor 3 has a smaller pressure drop in a flow path than a conventional electric motor in which flow of air in a bracket at a driving side goes toward a shaft, and bends back in a direction away from the shaft, if conditions other than specified above are the same. Additionally, in comparison to a conventional electric motor in which air flows unidirectionally through a ventilation path of a stator core, the electric motor 3 has the same heat radiation area while being smaller in a cross-section of a flow path than the conventional electric motor, and the electric motor 3 is higher in speed of air flowing in the flow path and higher in cooling capacity than the conventional electric motor, if conditions other than specified above are the same.

The air blown by the blower and having flowed through the inflow path 24 into the inside of the electric motor 3 passes, in order, through the first ventilation paths 26 included in the first ventilation path group 26a, the third ventilation path 28a, and the second ventilation paths 27 included in the second ventilation path group 27a, and flows out to the outside of the electric motor 3 through the outflow path 25a. Alternatively, the air blown by the blower and having flowed through the inflow path 24 into the inside of the electric motor 3 passes, in order, through the first ventilation paths 26 included in the first ventilation path group 26b, the third ventilation path 28b, and the second ventilation paths 27 included in the second ventilation path group 27b, and flows out to the outside of the electric motor 3 through the outflow path 25b. Since the air having flowed into the inside of the electric motor 3 flows while undergoing heat exchange, temperature of the air increases while the air flows through the inside of the electric motor 3. That is to say, temperatures of air located in the first ventilation paths 26 included in the first ventilation path group 26a and in the first ventilation paths 26 included in the first ventilation path group 26b are lower than temperatures of air located in the second ventilation paths 27 included in the second ventilation path group 27a and in the second ventilation paths 27 included in the second ventilation path group 27b. Since the first ventilation path groups 26a and 26b are positioned symmetrically with respect to the plane containing the rotation axis AX, variance in temperatures in the stator core 20 in the circumferential direction is reduced.

As described above, according to the electric motor 3 according to Embodiment 3 of the present disclosure, the first ventilation path groups 26a and 26b of the stator core 20 are positioned symmetrically with respect to the plane containing the rotation axis AX. This enables reduction of variance in temperatures in the stator core 20 in the circumferential direction, and thus, enables reduction of occurrence of a malfunction of the electric motor 3 that is caused by the occurrence of extremely high temperature at a part of the stator core 20.

Embodiment 4

Figure 13:
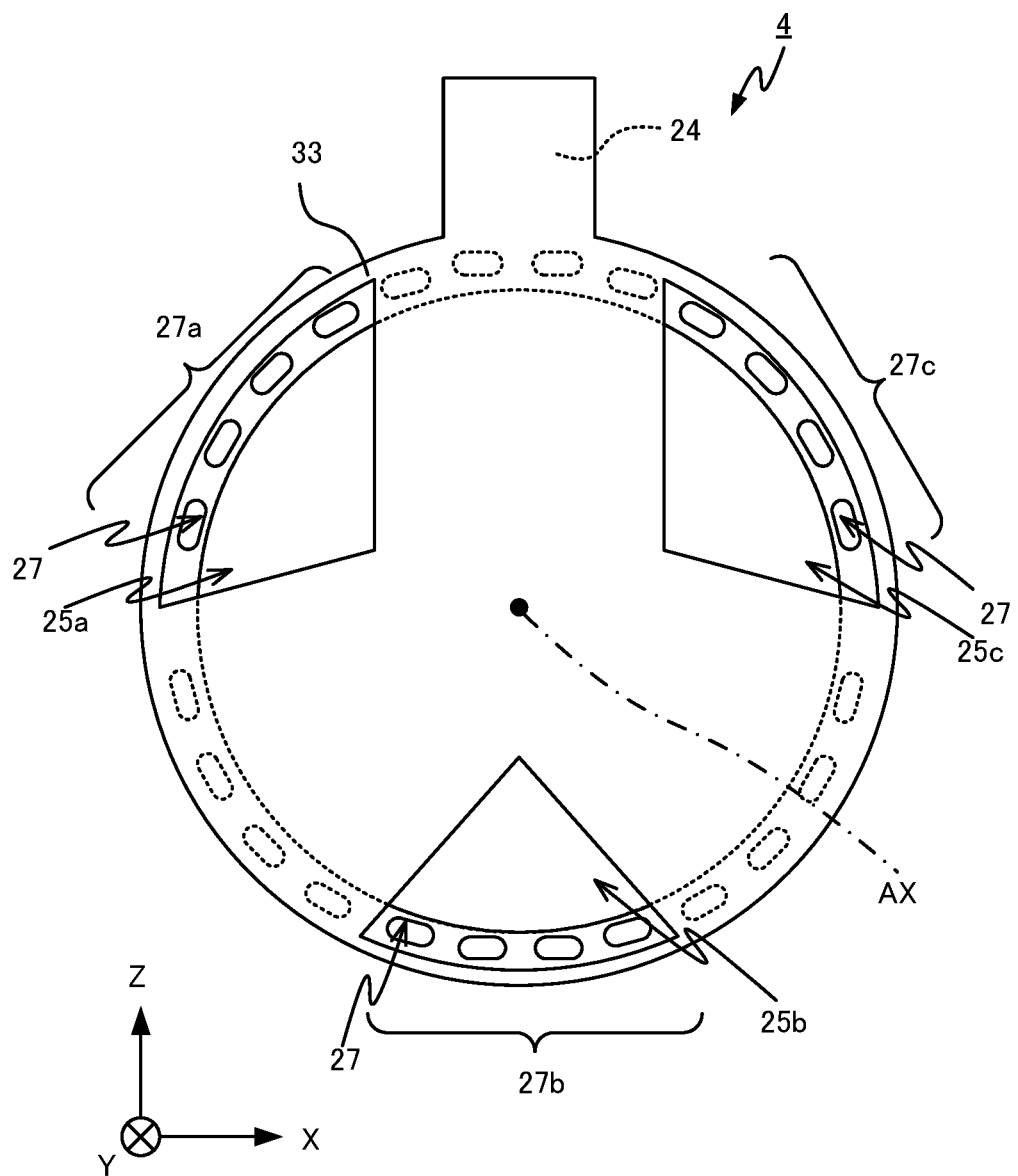
FIG. 13 is a side view of an electric motor according to Embodiment 4.

The numbers of the first ventilation path groups and the second ventilation path groups may be freely selected. In Embodiment 4, an example electric motor is described that includes three first ventilation path groups and three second ventilation path groups. An electric motor 4 according to Embodiment 4 that is illustrated in FIG. 13 includes, instead of the first bracket 13 included in the electric motor 1 according to Embodiment 1, a first bracket 33. The first bracket 33 includes three outflow paths 25a, 25b, and 25c positioned with spacings in the circumferential direction. The outflow path 25a is coupled with, via the through-hole 12 of the frame 11, second ventilation paths 27 included in a second ventilation path group 27a described below. The outflow path 25b is coupled with, via the through-hole 12 of the frame 11, second ventilation paths 27 included in a second ventilation path group 27b described below. The outflow path 25c is coupled with, via the through-hole 12 of the frame 11, second ventilation paths 27 included in a second ventilation path group 27c described below.

Figure 14:
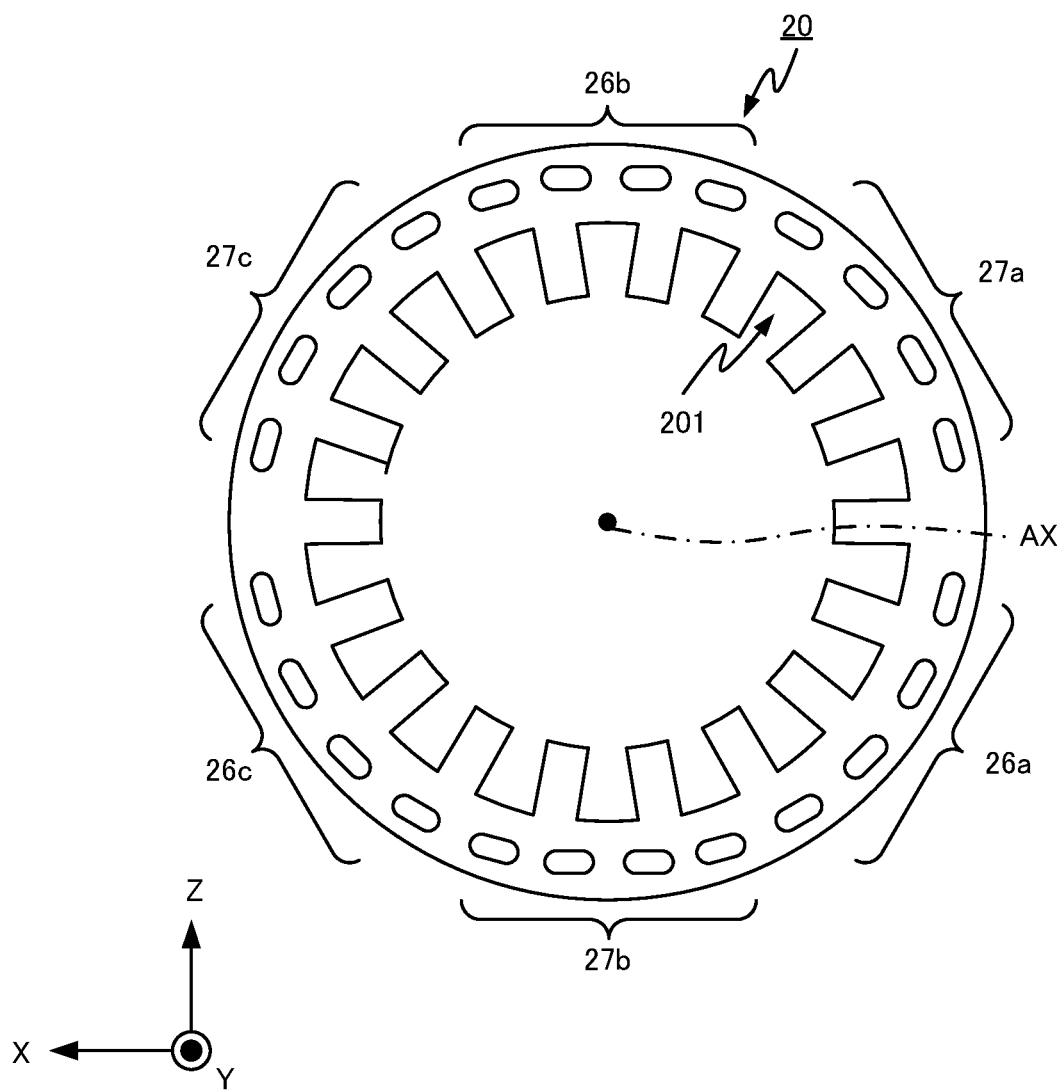
FIG. 14 is a side view of a stator core according to Embodiment 4.

As illustrated in FIG. 14 that is a drawing of the stator core 20 as viewed in the negative Y-axis direction, the stator core 20 includes multiple first ventilation path groups 26a, 26b, and 26c that each include multiple first ventilation paths 26, and multiple second ventilation path groups 27a, 27b, and 27c that each include multiple second ventilation paths 27. The first ventilation path groups 26a, 26b, and 26c, and the second ventilation path groups 27a, 27b, and 27c, are positioned alternately in the circumferential direction. Specifically, as illustrated in FIG. 14, the first ventilation path group 26a, the second ventilation path group 27a, the first ventilation path group 26b, the second ventilation path group 27c, the first ventilation path group 26c, the second ventilation path group 27b, are disposed, in order, counterclockwise in the circumferential direction. Further, each of the second ventilation path groups 27a, 27b, and 27c is positioned symmetrically, with respect to the XY plane containing the rotation axis AX, to a corresponding one of the first ventilation path groups 26a, 26b, and 26c. The first ventilation paths 26 included in the first ventilation path group 26a, the first ventilation paths 26 included in the first ventilation path group 26b, and the first ventilation paths 26 included in the first ventilation path group 26c are each coupled with the inflow path 24 via the through-hole 12. The second ventilation paths 27 included in the second ventilation path group 27a are coupled with the outflow path 25a via the through-hole 12, the second ventilation paths 27 included in the second ventilation path group 27b are coupled with the outflow path 25b via the through-hole 12, and the second ventilation paths 27 included in the second ventilation path group 27c are coupled with the outflow path 25c via the through-hole 12.

Figure 15:
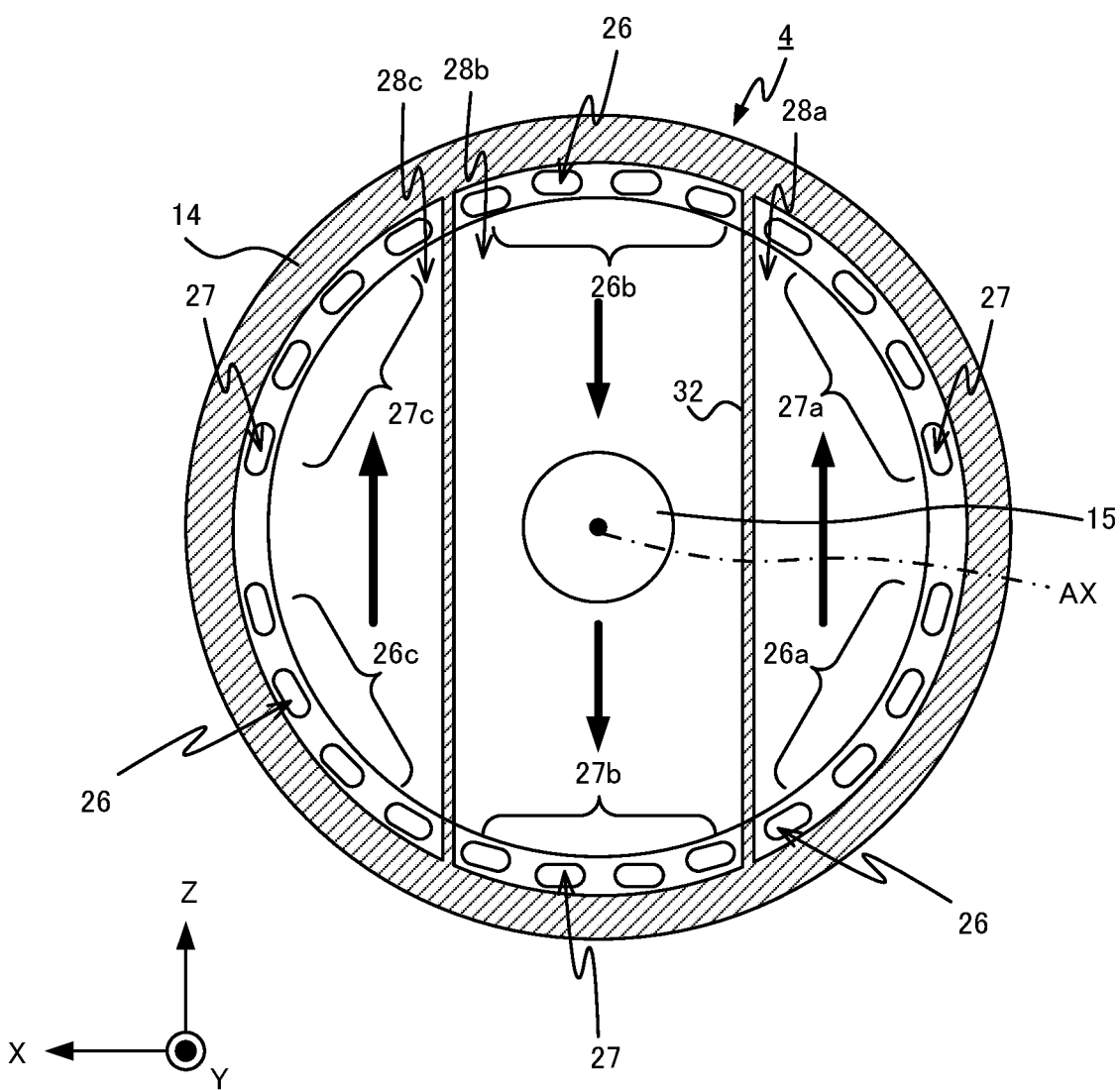
FIG. 15 is a cross-sectional view of the electric motor according to Embodiment 4.

In FIG. 15 that is a cross-sectional view of the second bracket 14 as viewed in the negative Y-axis direction, flows of air are illustrated using solid arrows. The second bracket 14 includes a third ventilation path 28a that forms a flow path from the first ventilation paths 26 included in the first ventilation path group 26a to the second ventilation paths 27 included in the second ventilation path group 27a, a third ventilation path 28b that forms a flow path from the first ventilation paths 26 included in the first ventilation path group 26b to the second ventilation paths 27 included in the second ventilation path group 27b, and a third ventilation path 28c that forms a flow path from the first ventilation paths 26 included in the first ventilation path group 26c to the second ventilation paths 27 included in the second ventilation path group 27c. The partition wall 32 separates the third ventilation paths 28a, 28b, and 28c from each other, and thus no flow of air occurs among the third ventilation paths 28a, 28b, and 28c. As illustrated in FIG. 15, the first ventilation paths 26 included in the first ventilation path group 26a and the second ventilation paths 27 included in the second ventilation path group 27a are positioned symmetrically with respect to the XY plane containing the rotation axis AX, the first ventilation paths 26 included in the first ventilation path group 26b and the second ventilation paths 27 included in the second ventilation path group 27b are positioned symmetrically with respect to the XY plane containing the rotation axis AX, and the first ventilation paths 26 included in the first ventilation path group 26c and the second ventilation paths 27 included in the second ventilation path group 27c are positioned symmetrically with respect to the XY plane containing the rotation axis AX.

Air flow is unidirectional in the positive Z-axis direction in the third ventilation path 28a, air flow is unidirectional in the negative-Z-axis direction in the third ventilation path 28b, and air flow is unidirectional in the positive Z-axis direction in the third ventilation path 28c. Thus, the electric motor 4 has a smaller pressure drop in the flow path than the conventional electric motor in which flow of air in a bracket at a driving side goes toward the shaft, and bends back in a direction away from the shaft, if conditions other than specified above are the same. Additionally, in comparison to a conventional electric motor in which air flows unidirectionally through a ventilation path of a stator core, the electric motor 4 has the same heat radiation area while being smaller in a cross-section of a flow path than the conventional electric motor, and the electric motor 4 is higher in speed of air flowing in a flow path and higher in cooling capacity than the conventional electric motor, if conditions other than specified above are the same.

The air blown by the blower and having flowed through the inflow path 24 into the inside of the electric motor 4 passes, in order, through the first ventilation paths 26 included in the first ventilation path group 26a, the third ventilation path 28a, and the second ventilation paths 27 included in the second ventilation path group 27a, and flows out to the outside of the electric motor 4 through the outflow path 25a. Alternatively, the air blown by the blower and having flowed through the inflow path 24 into the inside of the electric motor 4 passes, in order, through the first ventilation paths 26 included in the first ventilation path group 26b, the third ventilation path 28b, and the second ventilation paths 27 included in the second ventilation path group 27b, and flows out to the outside of the electric motor 4 through the outflow path 25b. Alternatively, the air blown by the blower having flowed through the inflow path 24 into the inside of the electric motor 4 passes, in order, through the first ventilation paths 26 included in the first ventilation path group 26c, the third ventilation path 28c, and the second ventilation paths 27 included in the second ventilation path group 27c, and flows out to the outside of the electric motor 4 through the outflow path 25c. Since the air having flowed into the inside of the electric motor 4 flows while undergoing heat exchange, temperature of the air increases while the air flows through the inside of the electric motor 4. That is to say, temperatures of air located in the first ventilation paths 26 included in the first ventilation path group 26a, in the first ventilation paths 26 included in the first ventilation path group 26b, and in the first ventilation paths 26 included in the first ventilation path group 26c, are lower than temperatures of air located in the second ventilation paths 27 included in the second ventilation path group 27a, in the second ventilation paths 27 included in the second ventilation path group 27b, and in the second ventilation paths 27 included in the second ventilation path group 27c. Since the first ventilation path groups 26a, 26b, and 26c are positioned with spacings in the circumferential direction, variance in temperatures in the stator core 20 in the circumferential direction is reduced.

As described above, according to the electric motor 4 according to Embodiment 4 of the present disclosure, the first ventilation path groups 26a, 26b, and 26c of the stator core 20 are positioned with spacings in the circumferential direction. This enables more reduction, than the electric motor 3, of variance in temperatures in the stator core 20 in the circumferential direction, and thus, enables reduction of occurrence of a malfunction of the electric motor 4 that is caused by the occurrence of extremely high temperature at a part of the stator core 20.

Embodiment 5

The flow path for air in the electric motor may have any shape that leads to cooling of the inside of the electric motor by the air flowing in the motor and that leads to a pressure drop that is smaller than that in a conventional electric motor. In Embodiment 5, an example electric motor is described in which a frame includes a first ventilation path and a second ventilation path. The electric motor 5 illustrated in FIG. 16 incudes, instead of the pair of the frames 11 included in the electric motor 1 according to Embodiment 1, a tubular frame 34. The frame 34 includes a first ventilation path 35 communicating with the inflow path 24, and a second ventilation path 36 communicating with the outflow path 25. In the electric motor 5, the stator core 20 does not include a ventilation path. Heat generated in the stator core 20 is transferred via the frame 34 to air flowing through the first ventilation path 35 and the second ventilation path 36. The first bracket 13 and the second bracket 14 are fixed on end surfaces of the frame 34 in the direction of the rotation axis AX.

Figure 16:
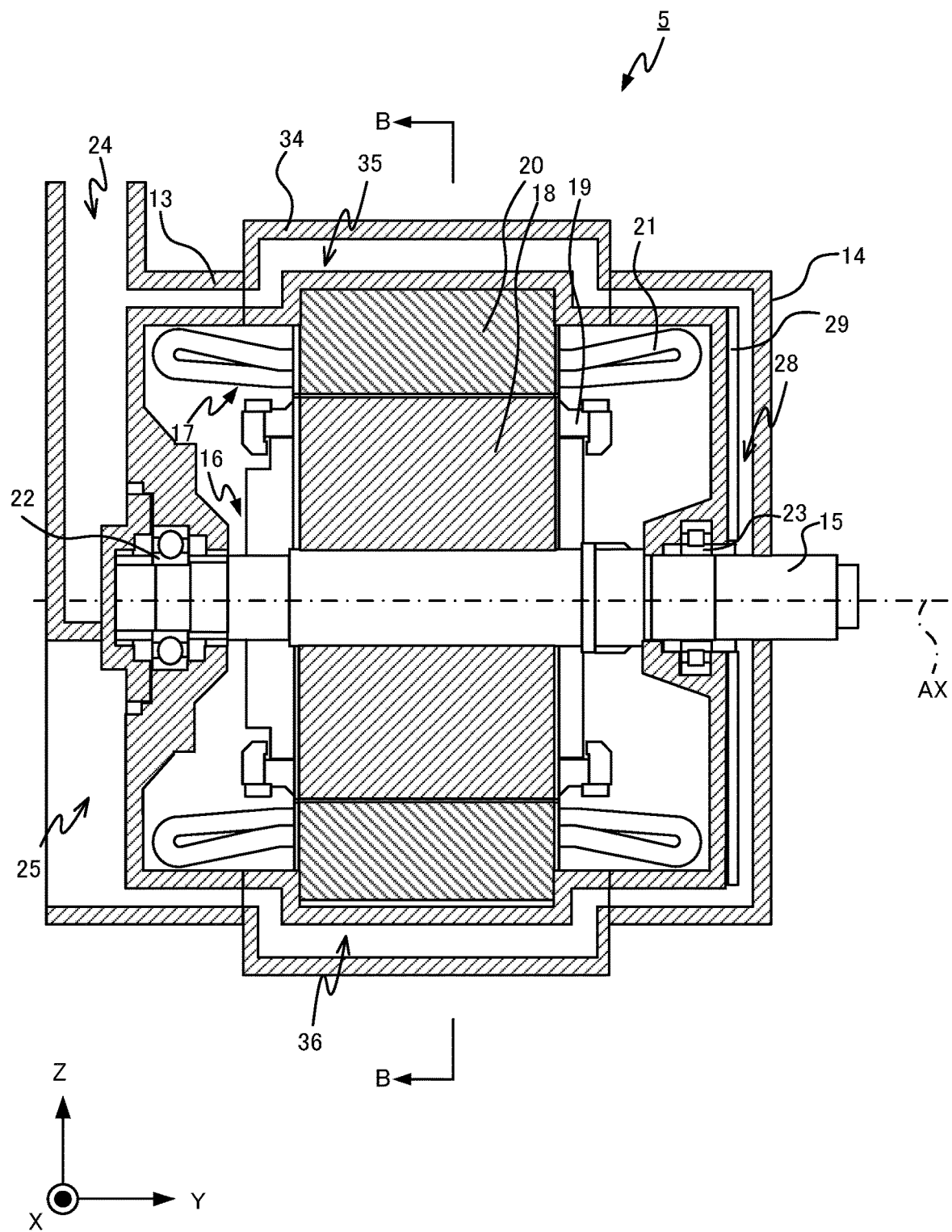
FIG. 16 is a cross-sectional view of the electric motor according to Embodiment 5.
Figure 17:
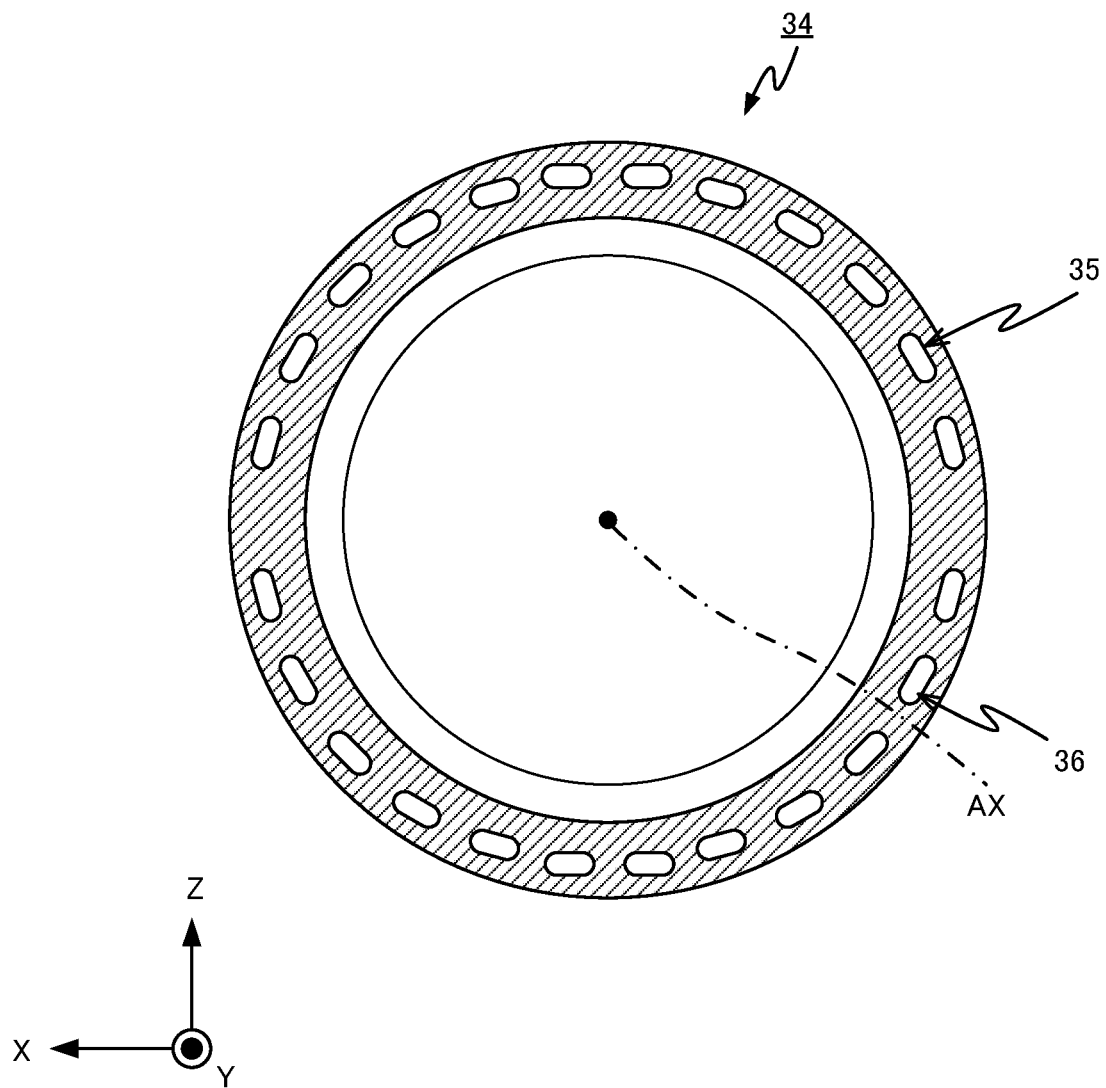
FIG. 17 is a cross-sectional view of a frame according to Embodiment 5.

As illustrated in FIG. 17 that is a cross-sectional view of the frame 34 taken along the B-B line in FIG. 16, multiple first ventilation paths 35 are positioned in the vertical-direction upper half of the frame 34, with spacings in the circumferential direction. Multiple second ventilation paths 36 are positioned in the vertical-direction lower half on the frame 34, with spacings in the circumferential direction. As illustrated in FIG. 16, the second bracket 14 includes the third ventilation path 28 that forms a flow path from the first ventilation paths 35 to the second ventilation paths 36. The second bracket 14 is similar in shape to that of Embodiment 1.

The air blown by the blower having flowed through the inflow path 24 into the inside of the electric motor 5 passes, in order, through the first ventilation paths 35, the third ventilation path 28, and the second ventilation paths 36, and flows out to the outside of the electric motor 5 through the outflow path 25.

As described above, in the electric motor 5 according to the present embodiment, the frame 34 includes the first ventilation paths 35 and the second ventilation paths 36. This eliminates the need for processing for forming a through-hole in the stator core 20, and thus enables simplification of the manufacturing process.

The present disclosure is not limited by the aforementioned embodiments. Any of the aforementioned embodiments may be freely combined. For example, the electric motor 5 may include the first bracket 30, and the frame 34 may include, similarly to Embodiment 3, multiple first ventilation paths 35 that are positioned symmetrically with respect to the XY plane containing the rotation axis AX and multiple second ventilation paths 36 that are positioned symmetrically with respect to the XY plane containing the rotation axis AX.

Any arrangement that enables formation of a flow path in which flow of air does not bend back in the third ventilation path 28 may be employed for the first ventilation path 26 and the second ventilation path 27. For example, the first ventilation path 26 and the second ventilation path 27 may be positioned symmetrically with respect to a YZ plane containing the rotation axis AX, or may be positioned symmetrically with respect to a plane that contains the rotation axis AX and forms a predetermined angle with the XY plane containing the rotation axis AX. The first ventilation path 26 and the second ventilation path 27 need not be positioned symmetrically with respect to the YZ plane containing the rotation axis AX, and may be positioned asymmetrically with respect to the YZ plane containing the rotation axis AX.

Further, the first ventilation path groups 26a and 26b and the second ventilation path groups 27a and 27b need not be equal in number, and the number of the first ventilation path groups 26a and 26b and the number of the second ventilation path groups 27a and 27b may be different.

The direction of the inflow path 24 opening is not limited to the vertical direction, and any direction that allows air from the blower disposed outside to flow into the inside of the electric motors 1-5 can be employed. For example, the direction of the inflow path 24 opening may be the direction of the rotation axis AX. The blower disposed outside the electric motors 1-5 may be a fan that rotates in conjunction with the rotation of the shaft 15. Further, in the electric motor 5, the first bracket 13 and the second bracket 14 may be fixed, via fixing members, on end surfaces of the frames 11 in the direction of the rotation axis AX.

The frames 11 may be omitted from the electric motors 1-4. In this case, each of the first brackets 13, 30, 31, 33, and the second bracket 14 are positioned to sandwich the stator core 20.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5 Electric motor
11, 34 Frame
12 Through-hole
13, 30, 31, 33 First bracket
14 Second bracket
15 Shaft
16 Rotor
17 Stator
18 Rotor core
19 Rotor conductor
20 Stator core
21 Stator conductor
22, 23 Bearing
24 Inflow path
25, 25a, 25b, 25c Outflow path
26, 35 First ventilation path
26a, 26b, 26c First ventilation path group
27, 36 Second ventilation path
27a, 27b, 27c Second ventilation path group
28, 28a, 28b, 28c Third ventilation path
29 Air flow baffle plate
32 Partition wall
AX Rotation axis

The invention claimed is:

1. An electric motor comprising:
a shaft that is rotatably supported for rotation around a rotation axis;
a rotor that is disposed outwardly of the shaft in a radial direction and rotates integrally with the shaft;
a stator that faces the rotor with a spacing therebetween in the radial direction;
a first bracket that includes (i) an inflow path through which air of an outside flows into an inside and (ii) an outflow path through which the air having flowed through the inflow path into the inside flows out to the outside; and
a second bracket that, with the first bracket, sandwiches the rotor and the stator in a direction of the rotation axis, wherein
the stator includes (i) a first ventilation path that penetrates the stator from an end to another end thereof in the direction of the rotation axis and communicates with the inflow path and (ii) a second ventilation path that penetrates the stator from the end to the another end thereof in the direction of the rotation axis, communicates with the outflow path, and is positioned spaced from the first ventilation path in a circumferential direction with respect to the rotation axis,
the second bracket includes a third ventilation path that forms a flow path from the first ventilation path to the second ventilation path positioned opposite to the first ventilation path with respect to a plane containing the rotation axis, and
the air having flowed through the inflow path into the inside passes, in order, through the first ventilation path, the third ventilation path, and the second ventilation path, and flows out to the outside through the outflow path.

2. The electric motor according to claim 1, wherein
the stator includes
first ventilation path groups that each include a plurality of the first ventilation paths positioned adjacent to each other in the circumferential direction, and
second ventilation path groups that each include a plurality of the second ventilation paths positioned adjacent to each other in the circumferential direction and are equal in number to the first ventilation path groups, and
the first ventilation path groups and the second ventilation path groups are positioned alternately in the circumferential direction.

3. The electric motor according to claim 2, wherein the inflow path included in the first bracket extends inwardly in the radial direction, from an outer peripheral surface of the first bracket to the rotation axis.

4. The electric motor according to claim 3, wherein the second bracket includes, in the third ventilation path, air flow baffle plates extending in a direction orthogonal to the plane containing the rotation axis.

5. The electric motor according to claim 2, wherein the second bracket includes, in the third ventilation path, air flow baffle plates extending in a direction orthogonal to the plane containing the rotation axis.

6. The electric motor according to claim 1, wherein the inflow path included in the first bracket extends inwardly in the radial direction, from an outer peripheral surface of the first bracket to the rotation axis.

7. The electric motor according to claim 6, wherein the second bracket includes, in the third ventilation path, air flow baffle plates extending in a direction orthogonal to the plane containing the rotation axis.

8. The electric motor according to claim 1, wherein the second bracket includes, in the third ventilation path, air flow baffle plates extending in a direction orthogonal to the plane containing the rotation axis.

9. An electric motor comprising:
a shaft that is rotatably supported for rotation around a rotation axis;
a rotor that is disposed outwardly of the shaft in a radial direction and rotates integrally with the shaft;
a stator that faces the rotor with a spacing therebetween in the radial direction;
a tubular frame that encompasses the rotor and the stator;
a first bracket that includes (i) an inflow path through which air of an outside flows into an inside and (ii) an outflow path through which the air having flowed through the inflow path into the inside flows out to the outside; and
a second bracket that, with the first bracket, sandwiches the rotor and the stator in a direction of the rotation axis, wherein
the first bracket and the second bracket are fixed to the frame at positions sandwiching the frame in the direction of the rotation axis,
the frame includes (i) a first ventilation path that communicates with the inflow path and (ii) a second ventilation path that communicates with the outflow path and is positioned spaced from the first ventilation path in a circumferential direction with respect to the rotation axis,
the second bracket includes a third ventilation path that forms a flow path from the first ventilation path to the second ventilation path positioned opposite to the first ventilation path with respect to a plane containing the rotation axis, and
the air having flowed through the inflow path into the inside passes, in order, through the first ventilation path, the third ventilation path, and the second ventilation path, and flows out to the outside through the outflow path.

10. The electric motor according to claim 9, wherein
the frame includes
first ventilation path groups that each include a plurality of the first ventilation paths positioned adjacent to each other in the circumferential direction, and
second ventilation path groups that each include a plurality of the second ventilation paths positioned adjacent to each other in the circumferential direction and are equal in number to the first ventilation path groups, and
the first ventilation path groups and the second ventilation path groups are positioned alternately in the circumferential direction.

11. The electric motor according to claim 10, wherein the inflow path included in the first bracket extends inwardly in the radial direction, from an outer peripheral surface of the first bracket to the rotation axis.

12. The electric motor according to claim 11, wherein the second bracket includes, in the third ventilation path, air flow baffle plates extending in a direction orthogonal to the plane containing the rotation axis.

13. The electric motor according to claim 10, wherein the second bracket includes, in the third ventilation path, air flow baffle plates extending in a direction orthogonal to the plane containing the rotation axis.

14. The electric motor according to claim 9, wherein the inflow path included in the first bracket extends inwardly in the radial direction, from an outer peripheral surface of the first bracket to the rotation axis.

15. The electric motor according to claim 14, wherein the second bracket includes, in the third ventilation path, air flow baffle plates extending in a direction orthogonal to the plane containing the rotation axis.

16. The electric motor according to claim 9, wherein the second bracket includes, in the third ventilation path, air flow baffle plates extending in a direction orthogonal to the plane containing the rotation axis.

* * * * *